Feb. 9, 1960
D. L. NANTZ
2,924,448
COILED SPRING STRUCTURE
Original Filed Aug. 7, 1957
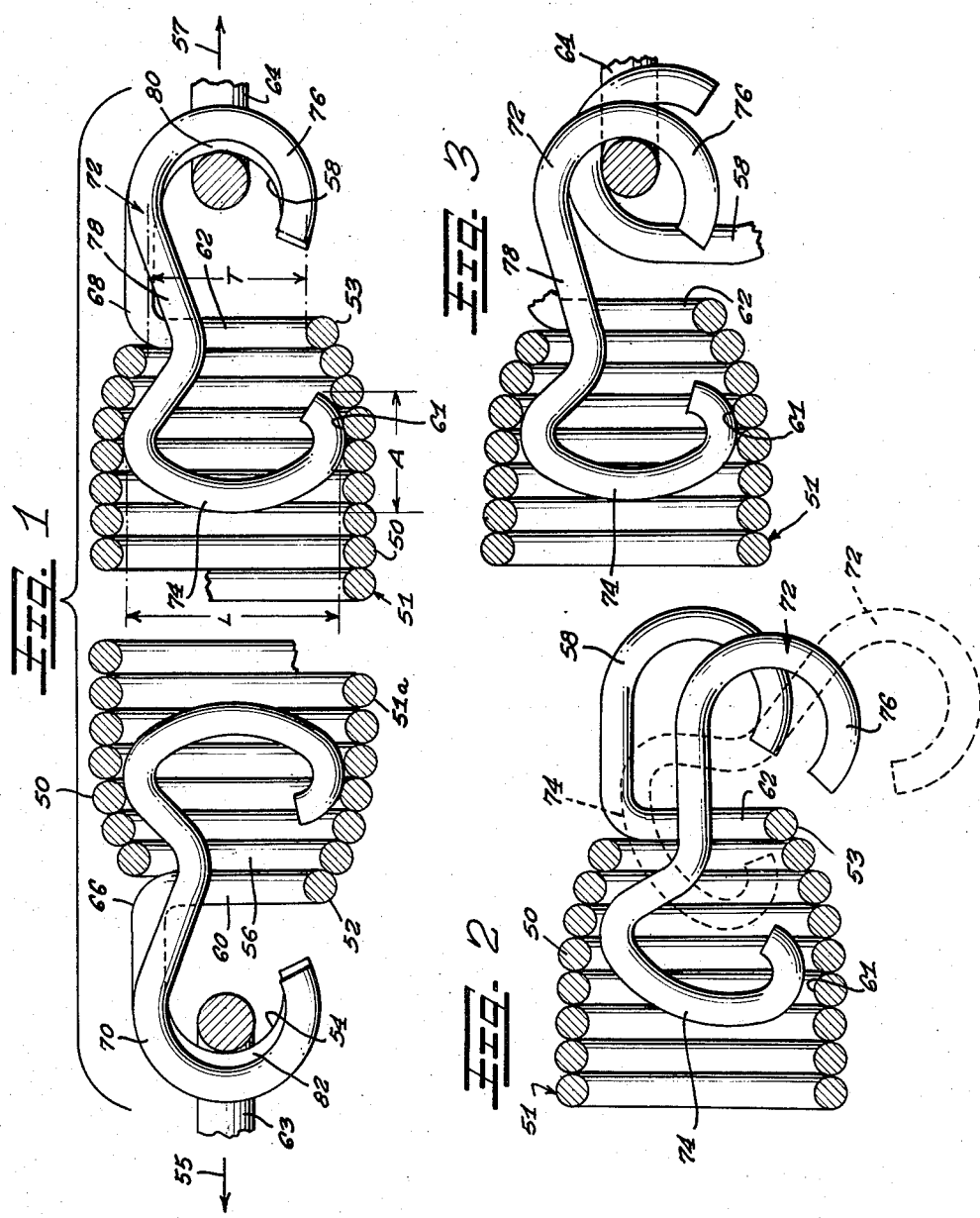
Inventor
Dean L. Nantz
By Hill, Sherman, Meroni, Gross & Simpson Attys

United States Patent Office 2,924,448
Patented Feb. 9, 1960

2,924,448

COILED SPRING STRUCTURE

Dean L. Nantz, Greenwood, S.C., assignor to Wonder Products Company, Collierville, Tenn., a corporation of Tennessee Original application August 7, 1957, Serial No. 676,778. Divided and this application November 19, 1958, Serial No. 775,061

7 Claims. (Cl. 267—74)

The present invention relates to improvements in springs, and more particularly to a coil tension spring having an improved end construction for connection to loads.

The present application is a division of my copending application, U.S. Serial No. 676,778, filed August 7, 1957.

The present invention contemplates the provision of a coil tension spring with hooks at the ends for connection to a load. Dual hooks are provided at each end of the spring with a primary hook which is integral with the material of the coil spring, and a secondary hook which has a unique relationship and connection to the body of the spring.

The spring contemplates use in a variety of environments, and is especially useful in providing a supporting spring for a riding toy for a child wherein safety is an important factor. In forming a coil tension spring with an integral hook, weaknesses may be introduced at the points where sharp bends occur, such as where the hook is formed at the end of the spring. A secondary hook is provided for safely assuming the weight of the load, and connecting the spring to the load in the event of failure of the primary hook which is integral with the spring. While safety connections have heretofore been provided for springs, these connectors have not provided a fully simple construction for manufacture, for assembly, and for use, and have not operated satisfactorily for the transfer of load with breakage of the primary hook.

Accordingly, it is an object of the present invention to provide a coil tension spring having improved features of safety and provided with a structure which will cause a continuation of satisfactory operation of the spring upon breakage of a primary connector at the spring end.

Another object of the invention is to provide an improved coil tension spring with hooks at the end for connecting to a load and provided with secondary or auxiliary hooks at the ends for use in the event of breakage of the regular or primary hooks and which will permit a smooth transition of the forces of the load from the primary to the secondary hook upon breakage of the primary hook.

A still further object of the invention is to provide an improved coil tension spring construction with a hook at the end for connecting to a load, and with a secondary hook which is readily and simply detached or attached to the end of the spring.

Other objects and advantages will become more apparent with the teaching of the principles of the invention in connection with the disclosure of the preferred embodiments thereof, in the specification, claims and drawings, in which:

Figure 1 is a vertical sectional view taken through the axis of a spring embodying the principles of the present invention;

Figure 2 is a vertical sectional view of one end of the spring of Figure 1, illustrating the method of attaching the secondary supporting or anchoring hook; and Figure 3 is a sectional view taken through the axis of the spring and illustrating the appearance of one end of the spring upon breakage of the primary hook.

As shown in the drawings:

A coil tension spring is shown at 51 having a body 51a which is substantially cylindrical in shape, and which tapers inwardly at the ends toward the end coils 52 and 53. The inward taper provides tapering the inner surfaces 56 and 61. The end coils of the spring form axial end openings 60 and 62, leading into the spring body 51a. The spring is wound of a spring wire 50, having the desirable characteristics for spring operation, and is preferably of metal, as will be appreciated by those versed in the art.

The spring wire 50 is wound to form the last coil of the spring at each end, and at the end 52, the spring wire is bent at right angles at 66 to the wire of the end coil, and the wire extends in an axial direction to form an end hook 54. The hook is formed to be opened so that it may be connected by hooking through a load eyelet 63.

At the other end of the coil spring 51, the spring wire is bent outwardly in an axial direction at 68, at right angles to the end coil to form a hook 58. This is hooked through a load eyelet 64 to connect the spring for operation. Thus, the spring will be connected or anchored at its ends by connecting the hooks 54 and 58 to the load eyelets 63 and 64. In operation of the spring, the eyelets will move outwardly in the direction of the arrows 55 and 57.

It will be observed that in forming the hooks 54 and 58, from the last coil at the ends 52 and 53 of the spring, a sharp bend must be formed which somewhat weakens the spring wire, and forms a location of stress concentration. The stress occurring at this point is a bending stress, and occurs as the spring expands with forces between the spring and load, with movement of the eyelets in the direction of the arrows 55 and 57. In many operations, the spring will operate under continuous expansion and contraction with continual flexing. This occurs in an environment such as above described when the spring is used for a spring supported toy for a child, such as a spring supported hobby horse.

The continued flexing of the spring in time creates fatigue in the metal and breakage may occur at the location of the sharp bends 66 and 68 at the base of the hooks 54 and 58.

The breakage of either hook from the body of the spring will cause a sudden release of the load and will permit the spring to snap back toward the other hook, because of its stored up energy, unless the spring is held. The present construction shows the spring retained by the secondary hook. The pick-up of the load by the secondary hook is smooth and even, without significant movement of the spring, and the load is assumed by the secondary hook, without interruption of operation of the system in which the spring functions. No serious shock will occur to the load, thus damaging the system or creating an unstable dynamic condition. Accordingly, an important feature of the invention is the manner in which the secondary hook assumes the load upon breakage of the primary hook without a serious breakage shock to the operating system.

The secondary support hook is provided and is independently connected to the end of the spring. A secondary hook 70 is provided for the end 52 of the spring, and another secondary hook 72 is provided at the end 53 of the spring. The secondary hooks 70 and 72 are identical in construction, and, therefore, only one need be described in detail.

The hook 72 has a base 74 which is formed by looping the wire of the hook to form an open bend in the manner shown in Figures 1 to 3. The loop is formed so that the lateral dimension "L," shown in Figure 1, is slightly smaller than the inside diameter of the body of the spring, but will wedge itself against the inner surface 61 at the tapered end of the spring. This will surely connect the base of the hook 72 to the end 54 of the spring to anchor the spring end.

The hook 72 has a hook end 76 which is substantially the same size and shape as the hook 58 which is integral with the spring. The hook is formed, however, so that the shank 78 which connects the base end 74 and the hook end 76, is sufficiently long so that in normal operation of the spring the hook 76 will not ride against the eyelet 64, but a small space 80 will be present between the eyelet 64 and hook end 76. The hook 70 is formed in the same manner so that a small space 82 will be present between the hook and the eyelet 63. Thus, in normal operation, no stress is placed upon the secondary hooks 70 and 72, but the entire load is carried from the ends of the spring by the integral hooks 54 and 58.

When breakage of the primary hook 58 occurs, such as shown in Figure 3, the load is immediately assumed by the secondary safety hook 72. Since the space 80 between the secondary hook and the eyelet is very small, this assumption of the load by the secondary hook is accomplished without noticeable shock to the load. Furthermore, the spring 51 will immediately function as a new spring having the new end, and will, of course, have the same spring characteristics as in its previous performance. This will permit the spring to continue to exert a force on the load eyelets 63 and 64 for continued operation of the system in which the spring is installed, or until the system can be stopped for installation of a new spring.

As will be noted from the drawings, when the primary hook 58 breaks and the force of the spring is transferred to the secondary hook 72, the base end 74 of the secondary hook wedges tightly in the tapered coils of the spring body 51a. The spring coils are resilient in a radial direction, and will expand slightly as the stored up energy of the spring pulls the spring tightly against the base end 74 of the secondary hook. Expansion of the coils provides a resilient connection between the secondary hook and the spring which, in effect, damps the shock of the load transfer with breakage of the primary hook.

The assembly of the secondary hook 72 on the spring 51 is easily accomplished. For purposes of this assembly, the base end 74 of the hook is looped so that its axial dimension, shown at A in Figure 1, is smaller than the throat opening T, as shown in Figure 1, at the end of the spring. Thus, by tilting the hook 72 in a lateral direction, as shown in the dotted line position of Figure 2, the base end 74 can be slipped into the open throat 62 at the end 53 of the spring. By then rotating the hook 72 through the solid line position of Figure 2 to the solid line position of Figures 1 and 3, the hook 72 will assume the operating position wherein it extends coaxially with the spring 51.

The hook is formed of a wire similar to the wire of the spring and since it does not have a sharp bend which corresponds to the bend 68 at the base of the hook 58, its strength in some respects is superior to the strength of the primary hook.

In operation, the spring 51 is assembled by placing auxiliary hooks 70 and 72 in each end by tilting them in a lateral direction, and then rotating them to the axial position. Both the integral primary hooks 54 and 58, and the auxiliary hooks 70 and 72 are then hooked through the eyelets 56 and 64. When this is accomplished for each of the springs ends, the load will be stably connected to the spring.

Should breakage of one of the primary hooks occur, such as at its base 64 or 68, as shown in Figure 3, the auxiliary hooks 70 or 72 will immediately assume the load without noticeable shock. The safety hooks 70 and 72 are continually kept in operative position, but are of a dimension such that no stress is placed on them during normal operation. Thus, no wear will be encountered by the secondary hooks, and no metal fatigue will occur during operation of the spring supported on its primary hooks. Also, the secondary hook is of a dimension so as to be close to the load eyelet so that only a very small movement will occur when the primary hook breaks.

Thus, it will be seen that I have provided an improved spring construction which meets the objectives and advantages hereinbefore set forth. The spring construction permits utilization in machines, toys and the like, wherein a tension spring must operate in a normal manner, and wherein breakage of the hook at the end of the spring would prove disastrous.

The secondary hook is constructed so that it will in no way interfere with the operation of the primary hook or the spring, and does not interfere with the assembly of the springs to the load. The hook itself is quickly and easily assembled on the spring and requires the addition of no expensive or complicated parts, or a provision of no critical machine operations for its assembly or operation.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. An improved spring construction comprising a body member including a wire helically wound to be expanded in axial tension and having integral hook-shaped ends for connecting the ends of the spring, said helical body member tapering toward a smaller diameter at each of the spring ends, and secondary hook members adapted for providing secondary connections between each of the ends of the spring and a spring anchor, said secondary hook members being formed of a wire with a base shaped to have a lateral dimension greater than an axial dimension whereby the hook members in lateral position with respect to the spring ends can be inserted therein and when turned to an axial connecting position will wedge within the tapered spring ends, the ends of the hook members when in axial connecting position extending axially a slightly greater distance than the integral hook-shaped ends of the spring.

2. A spring comprising a spring body formed of a spiral coiled spring wire wound about a central axis and tapering to a smaller diameter at an open end, a first connecting means connected at said open end for anchoring the spring, and a second connecting means for anchoring the spring at said open end in an operating position and movable between a first position and said operating position with respect to the spring, said second connecting means having a base of dimensions to pass into the end of the tapered open spring end in said first position and to be impassible through said open end in said operating position whereby the base will wedge against the inside of the tapered spring end for forming an additional anchor for the spring end.

3. A spring comprising a spring body formed of a spiral coiled spring wire wound about a central axis and tapering to a smaller diameter at an open end, a first connecting means connected at said open end for anchoring the spring, and a second connecting means for anchoring the spring at said open end having a base with a first lateral dimension wider than the size of the open end of the spring, with a second lateral dimension taken at right angles to the first lateral dimension and being smaller than said open end, and with an axial dimension smaller than the open end so that the base may be passed into said open end when the connecting means is in a lateral position and will lock within the end when the connecting means is in an axial position and so that the second connecting means will form an additional spring anchor in the axial position.

4. An improved safety spring construction comprising in combination a spring body having elastic spring properties, means at the first end of the spring body for connecting the spring to a load, and means at the second end of the spring for connecting the spring to a load including a primary connector, including a secondary connector free of attachment to said connecting means at the second end of the spring having a dimension so that it will not engage the load except on breakage of the primary connector, and including a resilient connection between the spring and the secondary connector whereby the shock of the stored up energy of the spring will be damped with breakage of the primary connector and transfer the spring force to the secondary connector.

5. A safety spring construction comprising a wound wire coiled spring body having elastic spring properties, means at an end of the spring body for connecting the body to a load including a primary connecting member integral with the spring wire coils at the spring end, a secondary separate connecting member free of attachment to said primary connecting member, said connecting members positioned to be connectable to a load with one of said connecting members engaging the load and the other of said connecting members free of load bearing relationship with the load and free of load transmitting engagement and attachment with said one member so that said other member will not wear during use of the spring but will connect the spring to the load upon failure of said one member, and an anchor for the secondary connecting member attached to the spring end separately from the primary connecting member to provide a connection independent from the primary connecting member.

6. A safety spring construction comprising a wound wire coiled spring body having elastic spring properties, means at an end of the spring for connecting the spring body to a load including a primary connecting member integral with the spring wire coils at the spring end, a secondary separate connecting member free of attachment to said primary connecting member, said connecting members positioned to be connectable to a load with said secondary connecting member extending axially beyond said primary connecting member and being free of load transmitting engagement and attachment with the primary member so that said secondary member will not wear during use of the spring but will connect the spring to the load upon failure of said primary member, and an anchor for the secondary connecting member attached to the spring end separately from the primary connecting member and independent of the primary connecting member.

7. A safety spring construction comprising a wound wire coiled spring body having elastic spring properties, a primary hook integral with the spring wire coils at the spring end, a secondary hook free of attachment to the primary hook, said hooks positioned to be connectable to a load, said secondary hook extending axially beyond said primary hook and being free of load transmitting engagement and attachment with the primary hook so that the secondary hook will not wear during use of the spring but will connect the spring to the load upon failure of the primary hook, and an anchor for the secondary hook attached to the spring end separately from the primary hook to provide a connection independent from the primary hook.

References Cited in the file of this patent

UNITED STATES PATENTS

| 315,959 | Pattyson | Apr. 14, 1885 |
| 769,362 | Terry | Sept. 6, 1904 |
| 935,982 | Herbert et al. | Oct. 5, 1909 |
| 1,013,925 | Bliss | Jan. 9, 1912 |
| 2,013,595 | Barnard | Sept. 3, 1935 |

FOREIGN PATENTS

| 381,894 | Great Britain | Oct. 13, 1932 |
| 538,098 | Italy | June 16, 1956 |